United States Patent
Guo et al.

(10) Patent No.: US 10,768,737 B2
(45) Date of Patent: Sep. 8, 2020

(54) DISPLAY PANEL, METHOD FOR MANUFACTURING THE SAME AND DISPLAY DEVICE

(71) Applicant: BOE TECHNOLOGY GROUP CO., LTD., Beijing (CN)

(72) Inventors: Yuzhen Guo, Beijing (CN); Xue Dong, Beijing (CN); Haisheng Wang, Beijing (CN); Chun Wei Wu, Beijing (CN); Yingming Liu, Beijing (CN); Changfeng Li, Beijing (CN); Yanan Jia, Beijing (CN); Xiaoliang Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 15/552,154

(22) PCT Filed: Feb. 3, 2017

(86) PCT No.: PCT/CN2017/072847
§ 371 (c)(1),
(2) Date: Jul. 9, 2018

(87) PCT Pub. No.: WO2017/206536
PCT Pub. Date: Dec. 7, 2017

(65) Prior Publication Data
US 2018/0321783 A1 Nov. 8, 2018

(30) Foreign Application Priority Data
Jun. 3, 2016 (CN) .......................... 2016 1 0391187

(51) Int. Cl.
*G06F 3/041* (2006.01)
*G02F 1/1333* (2006.01)
*G02F 1/1343* (2006.01)

(52) U.S. Cl.
CPC ........ *G06F 3/0414* (2013.01); *G02F 1/13338* (2013.01); *G02F 1/133305* (2013.01);
(Continued)

(58) Field of Classification Search
CPC ...... G06F 3/0414; G06F 3/041; G06F 3/0412; G06F 2203/04102; G06F 2203/04103;
(Continued)

(56) References Cited

U.S. PATENT DOCUMENTS 9,195,333 B2 * 11/2015 Wang .................. G02F 1/13338
9,262,003 B2 *  2/2016 Kitchens ............... G06F 3/0436
(Continued)

FOREIGN PATENT DOCUMENTS

CN          101558370 A       10/2009
CN          104409473 A        3/2015
(Continued)

OTHER PUBLICATIONS

Extended European search report for European Patent Application No. 17749594.2, dated Dec. 10, 2018, 10 pages.
(Continued)

*Primary Examiner* — Andrew Sasinowski
(74) *Attorney, Agent, or Firm* — Westman, Champlin & Koehler, P.A.

(57) ABSTRACT

The present disclosure relates to a display panel, a method for manufacturing the same and a display device. The display panel includes: a substrate; pixel units; and a force sensing array, the force sensing array comprises lower leads, lower sensing electrodes, a piezoelectric layer, upper sensing electrodes and upper leads; wherein lower sensing electrodes and upper sensing electrodes are aligned with each other one by one, and arranged in an array, and each of lower sensing electrodes and each of upper sensing electrodes form a force sensing unit with the piezoelectric layer
(Continued)

therebetween; and wherein each of the plurality of lower leads and each column of the force sensing units are aligned with each other one by one, and each of the plurality of upper leads and each row of the force sensing units are also aligned with each other one by one.

19 Claims, 6 Drawing Sheets

(52) U.S. Cl.
CPC ........ *G02F 1/133308* (2013.01); *G06F 3/041* (2013.01); *G06F 3/0412* (2013.01); *G02F 1/134309* (2013.01); *G02F 2001/133394* (2013.01); *G06F 2203/04102* (2013.01); *G06F 2203/04103* (2013.01)

(58) Field of Classification Search
CPC ........... G02F 1/13338; G02F 1/133308; G02F 1/133305; G02F 2001/133394; G02F 1/134309
See application file for complete search history.

(56) References Cited

U.S. PATENT DOCUMENTS

| | | |
|---|---|---|
| 2010/0013785 A1 | 1/2010 | Murai et al. |
| 2010/0300862 A1 | 12/2010 | Tamura et al. |
| 2013/0335371 A1 | 12/2013 | Bayramoglu et al. |
| 2014/0354597 A1* | 12/2014 | Kitchens, II .......... G06F 1/3215 345/175 |
| 2016/0299631 A1* | 10/2016 | Lee .......................... G06F 3/044 |

FOREIGN PATENT DOCUMENTS

| | | |
|---|---|---|
| CN | 104765498 A | 7/2015 |
| CN | 105045453 A | 11/2015 |
| CN | 105068695 A | 11/2015 |
| CN | 105549245 A | 5/2016 |
| CN | 106020553 A | 10/2016 |
| CN | 205788139 U | 12/2016 |

OTHER PUBLICATIONS

First Office Action, including Search Report, for Chinese Patent Application No. 201610391187.1, dated Apr. 23, 2018, 19 pages.
The International Search Report and The Written Opinion, including English translation of the International Search Report and Box No. V of the Written Opinion from PCT/CN2017/072847, dated Feb. 3, 2017, 18 pages.
M \* cited by examiner

DISPLAY PANEL, METHOD FOR MANUFACTURING THE SAME AND DISPLAY DEVICE

CROSS-REFERENCE TO RELATED APPLICATION

This application is a Section 371 National Stage Application of International Application No. PCT/CN2017/072847, filed Feb. 3, 2017, which has not yet published, and claims the priority of Chinese Patent Application 201610391187.1 filed on Jun. 3, 2016 in the State Intellectual Property Office of China, the contents of which are incorporated herein by reference in their entirety.

TECHNICAL FIELD

The present disclosure relates to a field of the display technology, especially to a display panel, a method for manufacturing the same and a display device.

DESCRIPTION OF THE RELATED ART

Pressure sensing technology refers to a technology for detecting externally applied forces, which was once applied to technical fields such as engineering control, medical treatment. Currently, in the field of the display technology, especially in the field of the mobile-phone and the tablet computer, the pressure sensing is achieved by incorporating an additional mechanism into a backlight portion of a liquid crystal display panel or an intermediate frame of a mobile-phone, which requires a modification to a structural design of the liquid crystal display panel or the mobile-phone; besides, due to a relatively large assembly tolerance, an detection accuracy is also limited.

Therefore, it is a problem to be solved by those skilled in the art how to implement a pressure sensing with a relatively high accuracy while a modification to hardware is relatively limited.

SUMMARY

In light of aforementioned prior art, the embodiment of the present disclosure provides a display panel, a method for manufacturing the same and a display device, so as to implement a pressure sensing with a relatively high accuracy in the display panel.

According to an aspect of the present disclosure, there is provided a display panel in embodiments thereof, comprising: a substrate; a plurality of pixel units provided on the substrate and arranged in an array; and a force sensing array provided above, below or within the plurality of pixel units, the force sensing array comprises a plurality of lower leads, a plurality of lower sensing electrodes, a piezoelectric layer, a plurality of upper sensing electrodes and a plurality of upper leads which are laminated sequentially, the plurality of lower sensing electrodes and the plurality of upper sensing electrodes are aligned with each other one by one respectively, and arranged in an array respectively, and each of the plurality of lower sensing electrodes and each of the plurality of upper sensing electrodes form a force sensing unit with the piezoelectric layer sandwiched therebetween; and each of the plurality of lower leads and each column of the force sensing units are aligned with each other one by one, and each of the plurality of upper leads and each row of the force sensing units are also aligned with each other one by one; or, each of the plurality of lower leads and each row of the force sensing unit are aligned with each other one by one, and each of the plurality of upper leads and each column of the force sensing units are also aligned with each other one by one.

According to an embodiment, in above display panel provided in embodiments thereof, the plurality of lower sensing electrodes and the plurality of upper sensing electrodes respectively form a pattern of grid in which opening areas of the plurality of pixel units are aligned with meshes thereof, in case that force sensing array is provided on a display side of the plurality of pixel units; or the plurality of lower sensing electrodes and the plurality of upper sensing electrodes respectively form a pattern of blocks, in case that the plurality of lower sensing electrodes and the plurality of upper sensing electrodes are made of a transparent conductive material.

According to an embodiment, in above display panel provided in embodiments thereof, the piezoelectric layer forms a pattern of grid in which opening areas of the plurality of pixel units are aligned with meshes thereof, and a grid line width of the grid structure of the piezoelectric layer is larger than that of the grid structure of the lower sensing electrodes.

According to an embodiment, in above display panel provided in embodiments thereof, the piezoelectric layer is made of a transparent piezoelectric ceramic and is of an integral layer construction.

According to an embodiment, in above display panel provided in embodiments thereof, the plurality of lower sensing electrodes and the plurality of upper sensing electrodes respectively form a pattern of blocks and the piezoelectric layer is of an integral layer construction, in case that the force sensing array is provided on a side of the plurality of pixel units opposite to the display side thereof.

According to an embodiment, in above display panel provided in embodiments thereof, an elastic spacer layer and a flexible film covering the elastic spacer layer are provided between the force sensing array and the plurality of pixel units, in case that the force sensing array is provided below the plurality of pixel units.

According to an embodiment, in above display panel provided in embodiments thereof, the lower sensing electrodes and the upper sensing electrodes are made of an organic conductive material.

According to an embodiment, in above display panel provided in embodiments thereof, the lower sensing electrodes and the upper sensing electrodes are made of polyethylene dioxythiophene (PEDOT).

According to an embodiment, in above display panel provided in embodiments thereof, the lower leads and the upper leads are made of an inorganic conductive material.

According to an embodiment, in above display panel provided in embodiments thereof, the lower leads and the upper leads are made of silver or ITO (Indium tin oxide).

According to an embodiment, in above display panel provided in embodiments thereof, the piezoelectric layer is made of lead zirconate titanate piezoelectric ceramics.

According to an embodiment, in above display panel provided in embodiments thereof, the display panel is a flexible display panel.

According to an embodiment, in above display panel provided in embodiments thereof, the force sensing array is at least provided in a frame area of the flexible display panel.

According to an embodiment, in above display panel provided in embodiments thereof, the display panel is one of a liquid crystal display panel, an electroluminescent display panel, a plasma display panel and an electronic paper.

According to an embodiment, in above display panel provided in embodiments thereof, the force sensing array is provided above the plurality of pixel units and specifically provided on an encapsulation film of the plurality of pixel units, in case that the display panel is the electroluminescent display panel.

According to an embodiment, in above display panel provided in embodiments thereof, the force sensing array is provided within the plurality of pixel units and specifically provided on films between light emitting components and pixel circuits of the plurality of pixel units, in case that the display panel is the electroluminescent display panel.

According to another aspect of the present disclosure, there is further provided a display device, comprising above display panel provided in embodiments thereof.

According to yet another aspect of the present disclosure, there is further provided a method for manufacturing above display panel, comprising following steps:

forming patterns of the plurality of lower leads, the plurality of lower sensing electrodes, the piezoelectric layer, the plurality of upper sensing electrodes and the plurality of upper leads sequentially by a solution process (sol-gel process), before, after or during by forming the plurality of pixel units arranged in an array on the substrate.

According to an embodiment, in above method provided in embodiments thereof, the step of forming patterns of the plurality of lower leads, the plurality of lower sensing electrodes, the piezoelectric layer, the plurality of upper sensing electrodes and the plurality of upper leads sequentially by a solution process (sol-gel process) specifically comprises:

forming patterns of the plurality of lower leads, the plurality of lower sensing electrodes, the piezoelectric layer, the plurality of upper sensing electrodes and the plurality of upper leads sequentially by ink-jet printing or screen printing.

BRIEF DESCRIPTION OF THE DRAWINGS

In order to clearly illustrate the embodiments of the present disclosure or the prior art, the following drawings, which are to be used in the description of the embodiments or the prior art, will be briefly described. It will be apparent that the drawings in the following description are merely a number of embodiments of the present disclosure, and other drawings may be readily conceivable to those ordinary skilled people in the art from these drawings.

DETAILED DESCRIPTION OF PREFERRED EMBODIMENTS

Figure 1:
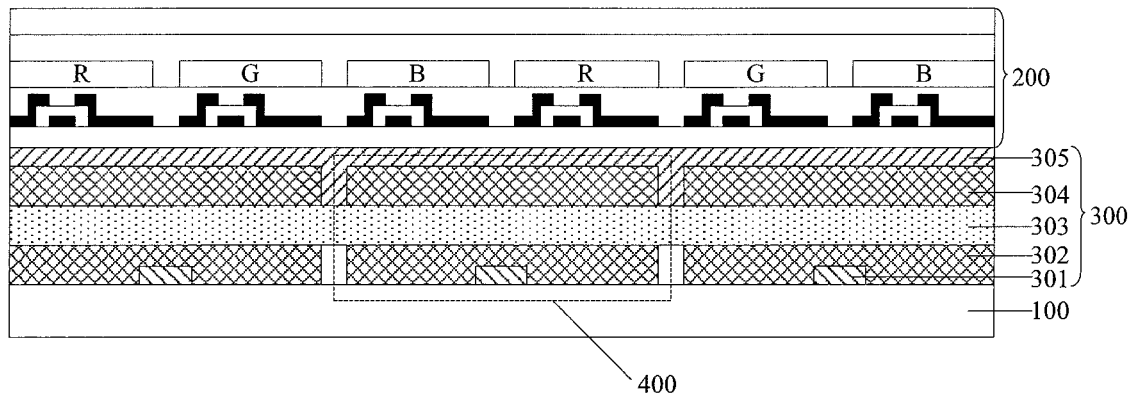
FIGS. 1 to 5 are structural schematic side views of a display panel provided in embodiments of the present disclosure, respectively.

The technical solution the present disclosure will now be further described in conjunction with the accompanying drawings and embodiments in the present disclosure. In the specification, same or similar reference numbers refer to same or similar components. Referring to attached drawings, the description of the embodiments of the present disclosure as follows is intended to interpret a general inventive concept of the present disclosure rather than to restrict the present disclosure.

According to a general concept of the present disclosure, a display panel is provided, comprising: a substrate; a plurality of pixel units provided on the substrate and arranged in an array; and a force sensing array provided above, below or within the plurality of pixel units. The force sensing array comprises a plurality of lower leads, a plurality of lower sensing electrodes, a piezoelectric layer, a plurality of upper sensing electrodes and a plurality of upper leads which are laminated sequentially. The plurality of lower sensing electrodes and the plurality of upper sensing electrodes are aligned with each other one by one respectively, and arranged in an array respectively, and each of the plurality of lower sensing electrodes and each of the plurality of upper sensing electrodes form a force sensing unit with the piezoelectric layer sandwiched therebetween. Each of the plurality of lower leads and each column of the force sensing units are aligned with each other one by one, and each of the plurality of upper leads and each row of the force sensing units are also aligned with each other one by one; or, each of the plurality of lower leads and each row of the force sensing unit are aligned with each other one by one, and each of the plurality of upper leads and each column of the force sensing units are also aligned with each other one by one.

Specific embodiments of the display panel, the method for manufacturing the same and the display device provided by the embodiments of the present disclosure are to be described in detail with reference to the drawings.

The shape and size of various components shown in the drawings do not reflect practical proportion of the display panel, just intended to show the contents of the present disclosure.

As shown in FIGS. 1 to 5, the display panel according to an embodiment of the present disclosure comprises: a substrate 100; a plurality of pixel units 200 which are provided on the substrate 100 and arranged in an array; and a force sensing array 300 provided above (shown in FIGS. 3 and 4), below (shown in FIGS. 1 and 2) or within (shown in FIG. 5) the plurality of pixel units 200. The force sensing array 300 comprises a plurality of lower leads 301, a plurality of lower sensing electrodes 302, a piezoelectric layer 303, a plurality of upper sensing electrodes 304 and a plurality of upper leads 305 which are laminated sequentially.

Figure 6:
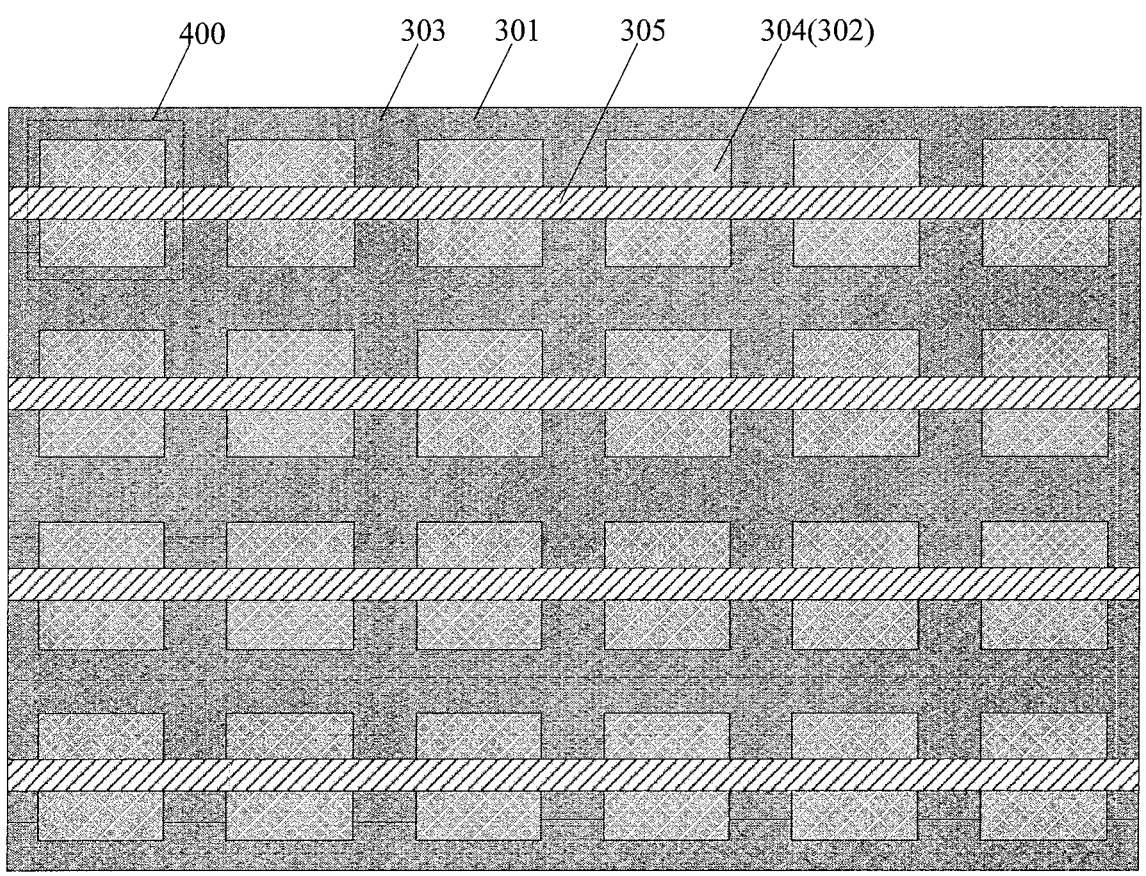
FIG. 6 is a structural schematic top view of a force sensing array in the structural schematic side views of the display panel provided in embodiments of the present disclosure as shown in FIGS. 1 and 2.
Figure 7:
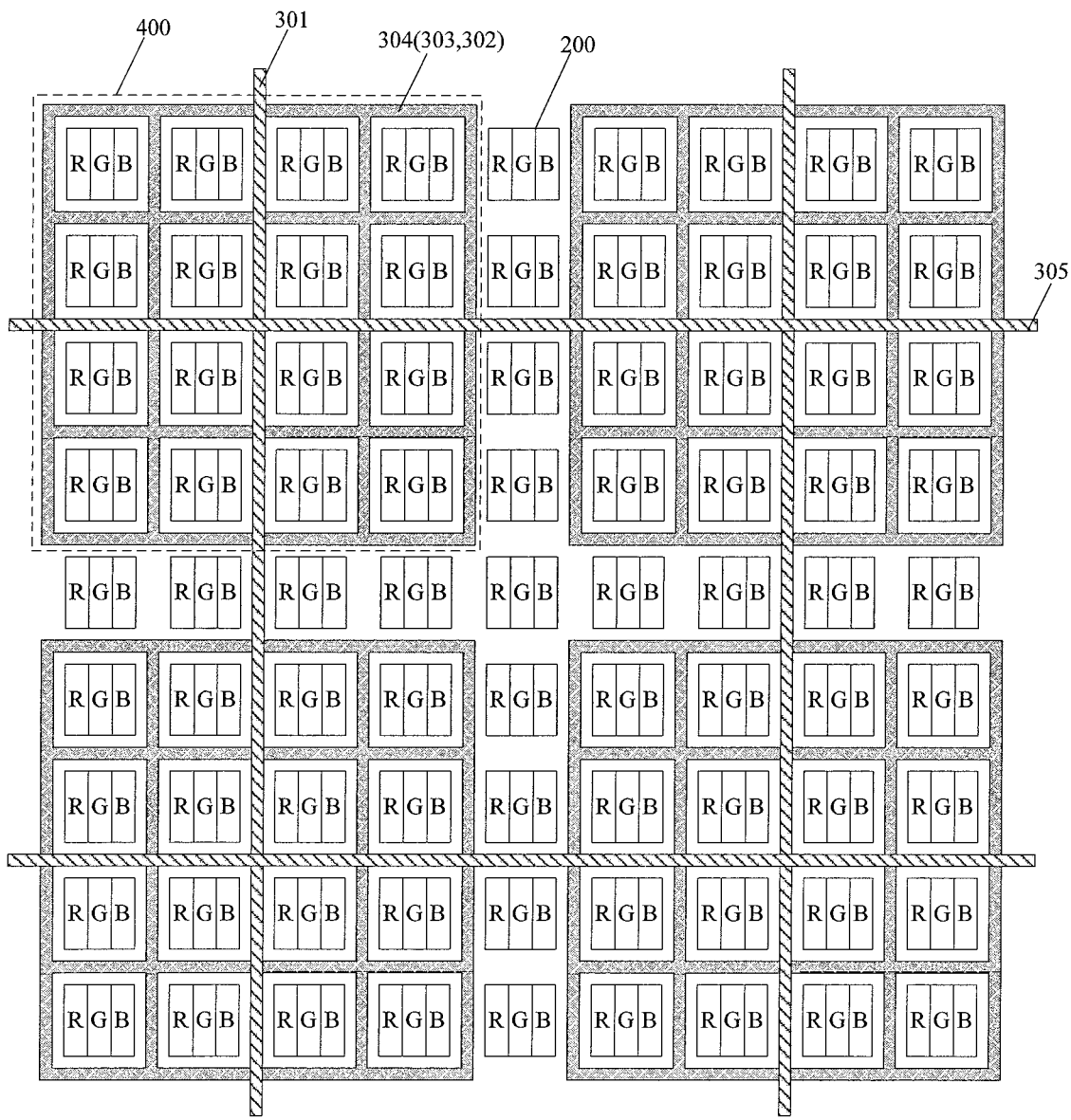
FIG. 7 is a structural schematic top view of a force sensing array in the structural schematic side view of the display panel provided in embodiments of the present disclosure as shown in FIG. 3.
Figure 8:
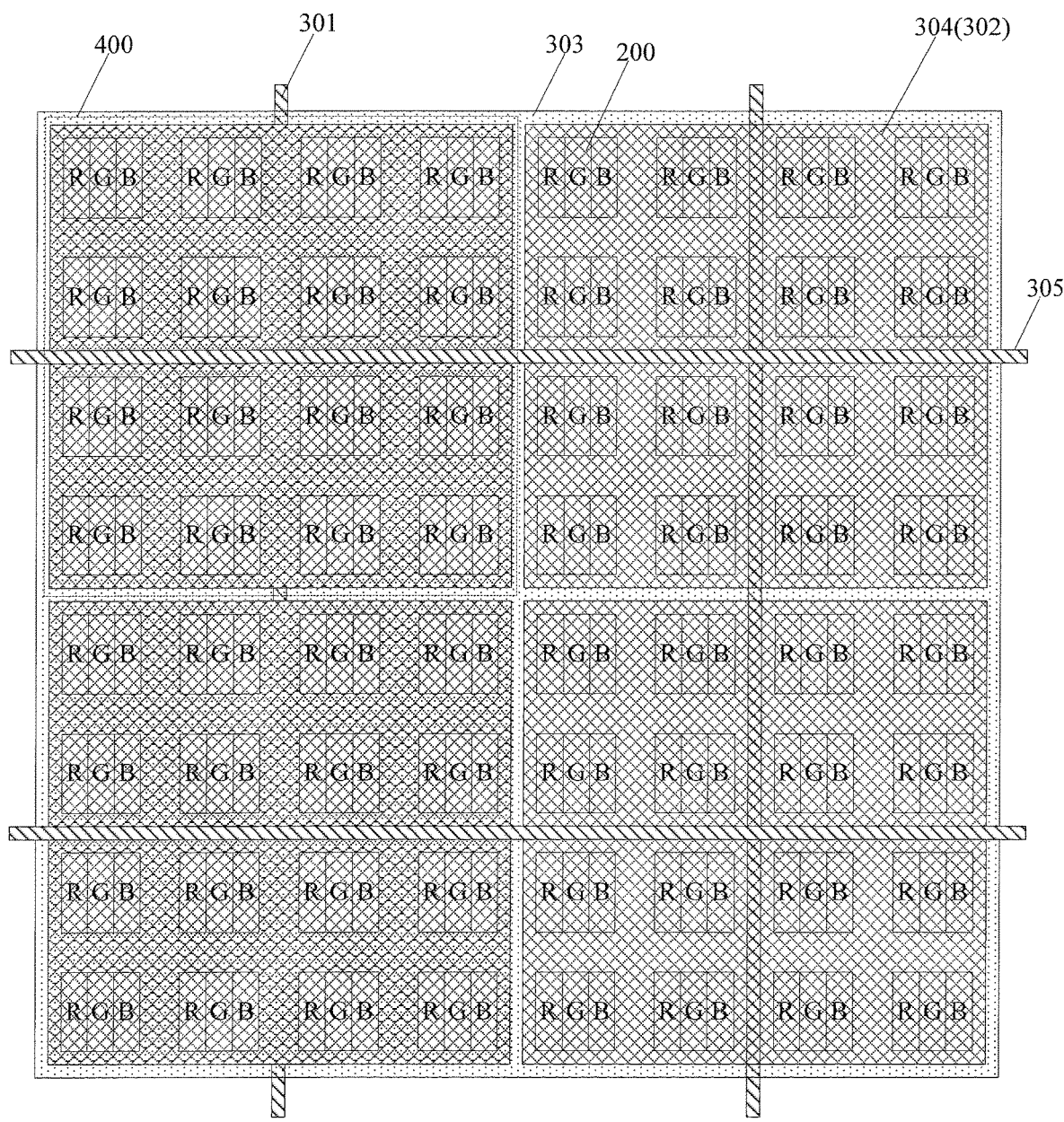
FIG. 8 is a structural schematic top view of a force sensing array in the structural schematic side views of the display panel provided in embodiments of the present disclosure as shown in FIGS. 4 and 5.

As shown in FIGS. 6 to 8, the plurality of lower sensing electrodes 302 and the plurality of upper sensing electrodes 304 are aligned with each other one by one respectively, and arranged in an array respectively, and each of the plurality of lower sensing electrodes and each of the plurality of upper sensing electrodes form a force sensing unit 400 with the piezoelectric layer 303 sandwiched therebetween.

As shown in FIGS. 6 to 8, each of the plurality of lower leads 301 and each column of the force sensing units 400 are connected with each other one by one, and each of the plurality of upper leads 305 and each row of the force sensing units 400 are also connected with each other one by one; or, each of the plurality of lower leads 301 and each row of the force sensing unit 400 are connected with each other one by one, and each of the plurality of upper leads 305 and each column of the force sensing units 400 are also connected with each other one by one.

Upon specific implementation, directions in which the lower leads 301 and the upper leads 305 are arranged are exchangeable. The lower leads 301 may function as scanning signal lines while the upper leads 305 may function as signal output lines; or the upper leads 305 may function as scanning signal lines and the lower leads 301 may function as signal output lines, without any specific limitation thereto.

In above display panel provided in embodiments of the present disclosure, the force sensing units 400 in the force sensing array 300 integrated above, below or within the plurality of pixel units 200 which work on basis of a piezoelectric effect may function as touch detection components for sensing a pressure applied to a surface of the display panel, and for outputting corresponding electrical signals by cooperation of the upper leads 305 with the lower leads 301. By a detection to the change of the electrical signals, the corresponding pressing location and a level of the pressure on the surface of the display panel may be determined, and then a corresponding command is executed corresponding to the determined touch location and the level of a touch force. In case that the display panel is a flexible display panel, the force sensing units 400 in the force sensing array 300 which are integrated above or below the plurality of pixel units 200 may also sense a tensile force applied on corresponding locations of the display panel once the display panel is bent, so as to control the display panel to execute a corresponding command according to the determined bent location and a level of the tensile force.

Specifically, in above display panel provided in embodiments of the present disclosure, in order that forces produced by pressing on each of the lower sensing electrodes 302 and each of the upper sensing electrodes 304 contained in a corresponding one of the force sensing units 400 may suffer a relatively smaller loss, enhancing sensitivities of the force sensing units 400 to detect the force. Upon specific implementation, an organic conductive material may be used to manufacture the lower sensing electrodes 302 and the upper sensing electrodes 304. Furthermore, the organic conductive materials are generally flexible and thus are beneficial to integrate the manufactured force sensing units 400 into the flexible display panel. Optionally, PEDOT may be chosen as the material of the lower sensing electrodes 302 and the upper sensing electrodes 304. Moreover, PEDOT is optionally used to form patterns of the lower sensing electrodes 302 or the upper sensing electrodes 304 by an ink-jet printing process or a screen printing process of a sol-gel, and thus is beneficial to be integrated into the flexible display panel which can withstand temperatures less than 80° C. Or, the upper sensing electrodes 304 and the lower sensing electrodes 302 of a non-flexible display panel may be made of ITO, without any specific limitation thereto.

Furthermore, although the organic conductive material has aforementioned advantages, it has a relatively poor electrical conductivity. Therefore, in order to facilitate transmitting electrical signals to the upper sensing electrodes 304 and the lower sensing electrodes 302, the lower leads 301 and the upper leads 305 are generally made of an inorganic conductive material. Optionally, an inorganic material having a relatively good electrical conductivity, such as silver or ITO, may be chosen as the material of the lower leads 301 and the upper leads 305.

Specifically, in above display panel provided in embodiments of the present disclosure, the piezoelectric layer 303 in the force sensing array 300 may be made of various piezoelectric ceramics materials presenting the piezoelectric effect, optionally lead zirconate titanate (PZT) piezoelectric ceramics. Further, the PZT is optionally used to form patterns of the piezoelectric layer 303 by an ink-jet printing process or a screen printing process of a sol-gel, and thus is beneficial to be integrated into the flexible display panel which can withstand temperatures less than 80° C. Upon specific implementation, a thickness of the piezoelectric layer is optionally controlled in a range of 2~4 μm.

Specifically, above display panel provided in embodiments of the present disclosure may be a flexible display panel, or a non-flexible one. In case that a flexible display panel is adopted, the force sensing array 300 integrated herein may not only detect a three-dimensional touch pressure but also detect a bending of the flexible display panel; and by a bending location and a bending angle thus determined, a control to the flexible display panel by different commands such as zooming in, zooming out, screen splitting, moving leftwards, rightwards, upwards and downwards, may be realized.

Figure 9:
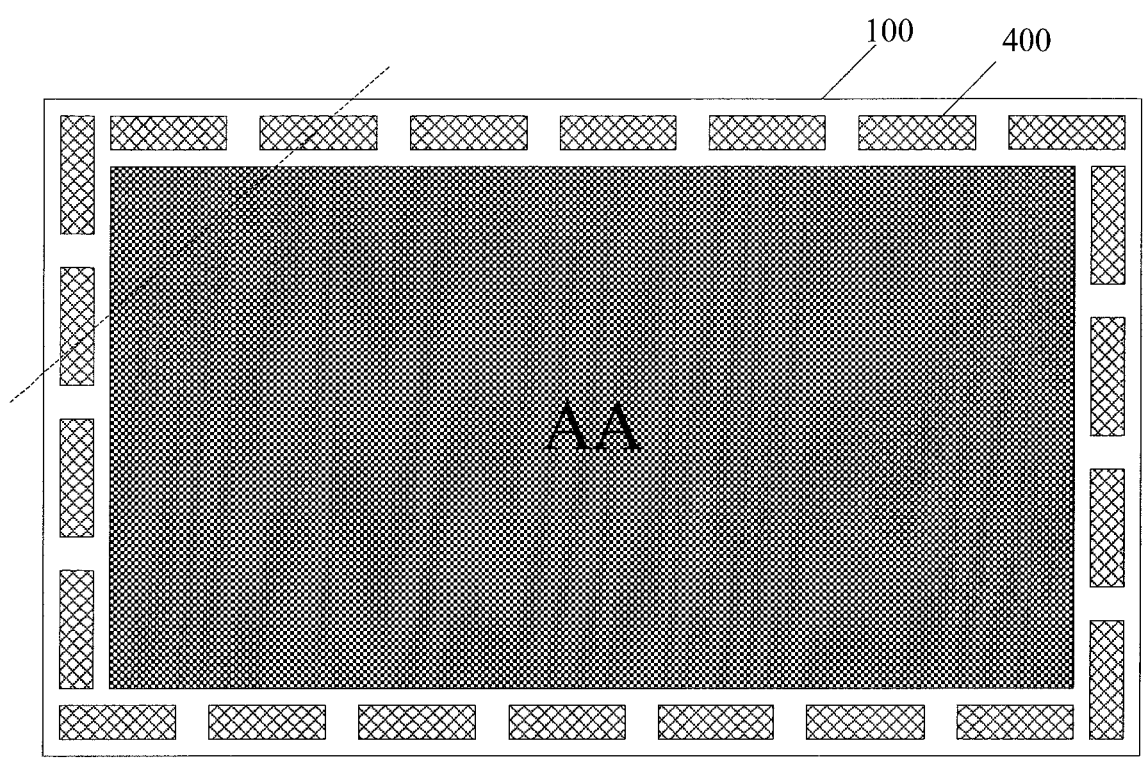
FIG. 9 is a structural schematic top view of the display panel provided in embodiments of the present disclosure, when it is applied into a flexible display substrate.

In addition, in above display panel provided in embodiments of the present disclosure, the force sensing array 300 may be provided at different regions of the display panel depending on different effects of the force sensing array 300: upon a three-dimensional detection to a touch action, the force sensing array 300 may just be integrated into an active display area (AA) of the display panel, or may be integrated in both the active display area (AA) and a frame area of the display panel. In case that only a bending of a flexible display panel is detected, as shown in FIG. 9, the force sensing array 300 may just be integrated into the frame area of the flexible display panel, such that by two force sensing units 400 which are bent over once the flexible display panel is bent along a broken line as shown, and depending on the bending location and the bending angle thus determined, a control to the flexible display panel with different commands may be realized. Certainly, the force sensing array 300 may also be integrated into the active display area (AA) and the frame area of the display panel, without any specific limitation thereto.

Furthermore, above display panel provided in embodiments of the present disclosure may be a liquid crystal display panel, an electroluminescent display panel, a plasma display panel, an electronic paper and the like, without any specific limitation thereto.

Taking above display panel provided in embodiments of the present disclosure which is an electroluminescent display panel for example hereinafter, i.e., the pixel units 200 are light emitting components, influences of a specific level location at which the force sensing array 300 is integrated on patterns of different components forming the force sensing array 300 may be set forth.

Upon specific implementation, in the display panel provided in embodiments of the present disclosure, the force sensing array 300 may be provided above the pixel units 200, or be provided below the pixel units 200, or alternatively within the pixel units 200. A display panel of a top-emitting type is taken for example hereinafter, in which a display face thereof is provided above the pixel units 200. Certainly, upon specific implementation, the display face of the display panel may be provided below the pixel units 200, i.e., the display panel is of a bottom-emitting type, without any specific limitation thereto.

One Embodiment

Figure 2:
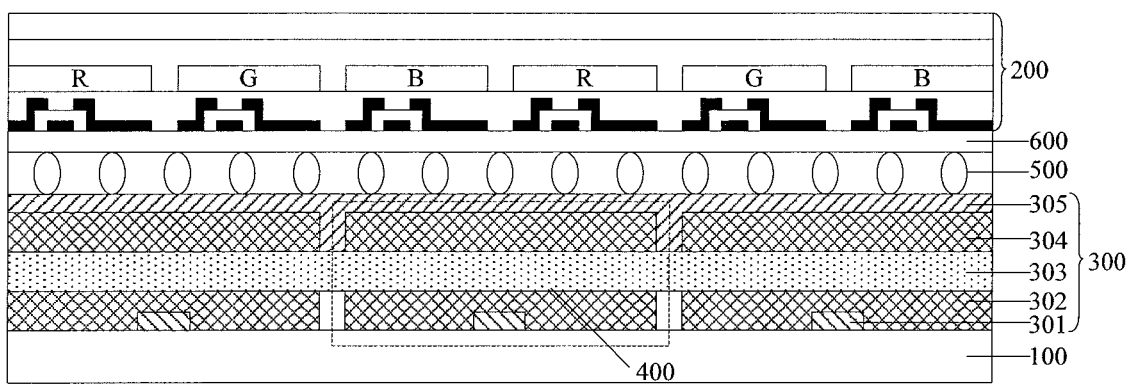

In the display panel provided in embodiments of the present disclosure, the force sensing array 300 is provided on a side of the display panel opposite to the display side of the pixel units 200, as shown in FIG. 1 and FIG. 2, the force sensing array 300 is provided below the pixel units 200, and the force sensing array 300 is firstly formed on the substrate 100, and then a manufacturing process of the pixel units 200 is performed.

At that time, in order to ensure that the force sensing units 400 are provided independently from one another, as shown in FIG. 6, the plurality of lower sensing electrodes 302 and the plurality of upper sensing electrodes 304 generally form a pattern of blocks respectively, and the pitch of each of the upper sensing electrodes 304 and the lower sensing electrodes 302 is optionally selected to be in a range of 3~5 mm. Moreover, to facilitate manufacturing, the piezoelectric layer 303 may be of an integral layer construction, i.e., an integral film without patterns.

Specifically, depending on a pitch of the upper sensing electrodes 304, a gap between adjacent upper leads 305 may be optionally set within a range of 3~5 mm; and depending on a pitch of the lower sensing electrodes 302, a gap between adjacent lower leads 301 may also be optionally set within a range of 3~5 mm.

Furthermore, in case that the force sensing array 300 is provided below the pixel units 200, in order to decrease weakening effect on the pressing force due to the pixel units 200 provided above the force sensing array 300, upon specific implementation, as shown in FIG. 2, an elastic spacer layer 500 and a flexible film 600 covering the elastic spacer layer 500 may be provided between the force sensing array 300 and the plurality of pixel units 200. Specifically, elastomer pellets which are made of a same material as that of a post spacer (PS) may be adopted to manufacture the elastic spacer layer 500, and the elastomer pellets may be covered with a layer of PI film (Polyimide Film).

Another Embodiment

In the display panel provided in embodiments of the present disclosure, the force sensing array 300 is provided on a display side of the plurality of pixel units 200, i.e., the force sensing array 300 is provided above the plurality of pixel units 200.

Figure 3:
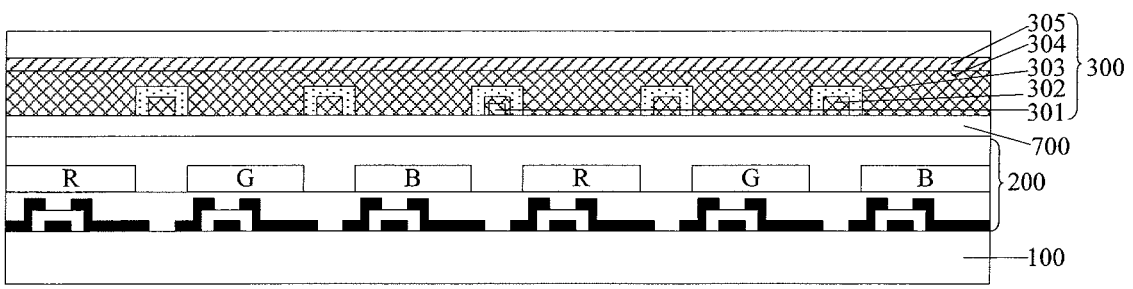
Figure 4:
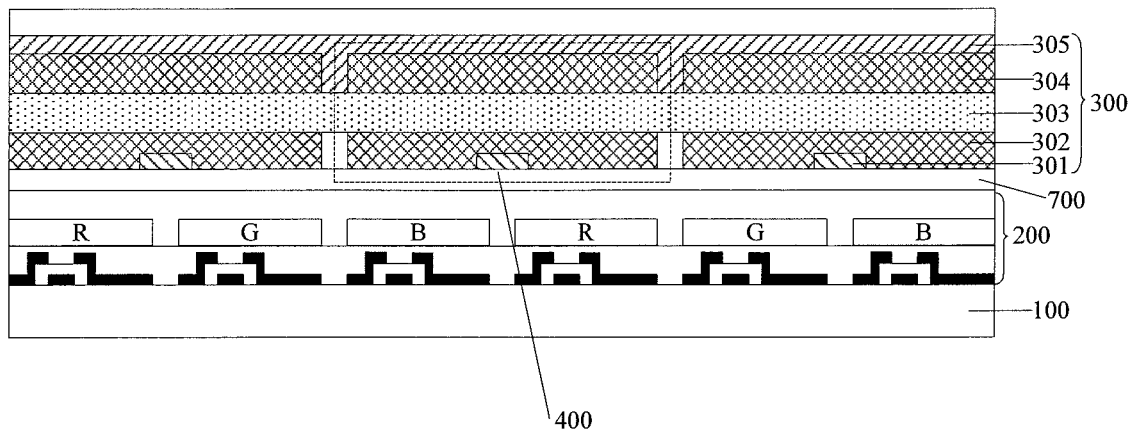

Specifically, in case that the display panel is an electroluminescent display panel, and the force sensing array 300 is provided above the plurality of pixel units 200, as shown in FIG. 3 and FIG. 4, the force sensing array 300 is generally provided on an encapsulation film of the plurality of pixel units 200, i.e., outside the encapsulation film 700.

In order to ensure that the force sensing units provided on the display face may not influence the luminance during normal display, upon specific implementation, as shown in FIG. 7, the lower sensing electrodes 302 and the upper sensing electrodes 304 may form a pattern which occupies just a non-display area in the active display area, i.e., an area covered by a black matrix or a pixel defining area, and specifically, the lower sensing electrodes 302 and the upper sensing electrodes 304 respectively form a pattern of grid in which opening areas of the plurality of pixel units 200 are aligned with meshes thereof. Each of the upper sensing electrodes 304 and each of the lower sensing electrodes 302 has a pitch therebetween which optionally is selected within a range of 3~5 mm, and are arranged in an array.

Or, upon specific implementation, a transparent conductive material may be chosen as the material of the lower sensing electrodes 302 and the upper sensing electrodes 304. For example, in case the transparent conductive material is applied to a flexible display panel, PEDOT may be optionally chosen as the transparent conductive material; and in case that the transparent conductive material is applied to a non-flexible display panel, ITO or PEDOT may be optionally chosen as the transparent conductive material. At that time, as shown in FIG. 8, the lower sensing electrodes 302 and the upper sensing electrodes 304 form a pattern similar to those in aforementioned embodiments, i.e., a block, in other words, there is no hole-boring design in the opening areas of the plurality of pixel units 200.

Similarly, in order to ensure that the force sensing units provided on the display face may not influence the luminance during normal display, upon specific implementation, as shown in FIG. 7, the pattern of piezoelectric layer 303 may be set to occupy just a non-display area in the active display area, i.e., an area covered by a black matrix or a pixel defining area. Specifically, the piezoelectric layer 303 forms a pattern of grid, in which opening areas of the plurality of pixel units 200 are aligned with meshes thereof. Moreover, in order to space the upper sensing electrode 304 and the lower sensing electrode 302 of one same force sensing unit apart from each other, as shown in FIG. 3, when forming the grid pattern of the piezoelectric layer 303, it is required that the pattern of the piezoelectric layer 303 covers the pattern of the lower sensing electrodes 302, i.e., a grid line width of the grid of the piezoelectric layer 303 is larger than that of the grid of the lower sensing electrodes 302. For example, in case that the grid line width of the lower sensing electrodes 302 is 10 μm, the grid line width of the piezoelectric layer 303 should be larger than 10 μm, optionally 10~15 μm. Upon specific implementation, the grid line width of the upper sensing electrodes 304 may be provided identical to, or slightly smaller than that of the piezoelectric layer 303.

Or, upon specific implementation, a transparent piezoelectric ceramic material may be chosen as the material of the piezoelectric layer 303. At that time, as shown in FIG. 8, the piezoelectric layer 303 may be of an integral layer construction, i.e., an integral film without patterns thereon.

Similarly, in order to ensure that the force sensing units provided on the display face may not influence the luminance during normal display, upon specific implementation, as shown in FIG. 7 and FIG. 8, the upper leads 305 and the lower leads 301 are generally provided in gaps among the pixel units 200, i.e., the patterns of the upper leads 305 and the lower leads 301 may occupy just a non-display area in the active display area, i.e., an area covered by a black matrix or a pixel defining area.

Furthermore, in application in liquid crystal display panel, a material of the upper leads 305 and the lower leads 301 may optionally be an electrically conductive material having a relatively small resistance without any specific limitation thereto while in application in an electroluminescent display panel, considering that the light emitting layer may withstand relatively low temperatures, the nano-silver may be chosen as the material of the upper leads 305 and the lower leads 301, so as to manufacture the patterns thereon with a sol-gel process.

Furthermore, depending on a pitch of the upper sensing electrodes 304, a gap between adjacent upper leads 305 may be optionally set within a range of 3~5 mm; and depending on a pitch of the lower sensing electrodes 302, a gap between adjacent lower leads 301 may also be optionally set within a range of 3~5 mm. Optionally, a center of each of the force sensing units 400 may be provided in a vertically overlapping area of the corresponding upper lead wire 305 and the corresponding lower lead wire 301.

Yet Another Embodiment

In the display panel provided in embodiments of the present disclosure, the force sensing array 300 is provided within the plurality of pixel units 200, i.e., the force sensing array 300 is provided between certain two films of the plurality of pixel units 200.

Figure 5:
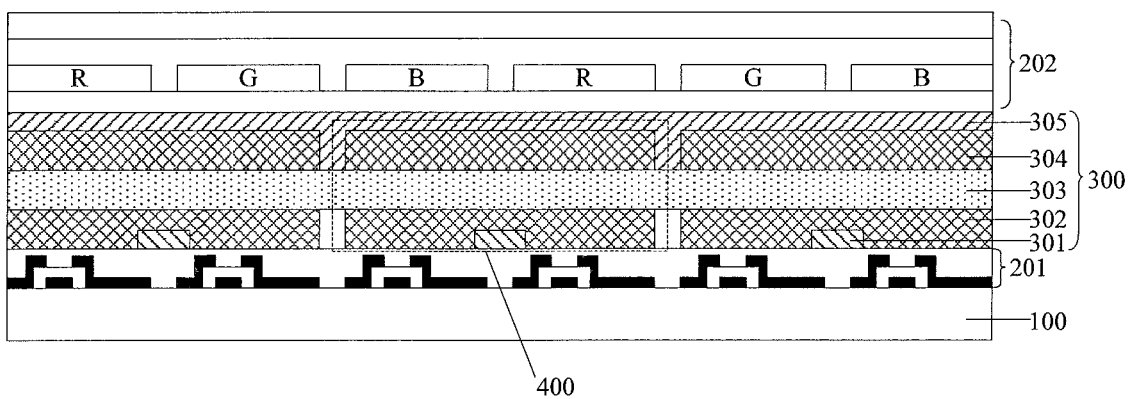

For example, as shown in FIG. 5, in case that the display panel is an electroluminescent display panel, the force sensing array 300 may be provided at a film between the pixel circuits 201 of the pixel units 200 and the light emitting components 202; moreover, the pixel circuits 201 and corresponding light emitting components 202 may be in electrical connection therebetween through via-holes. Specific shapes of the components which form the force sensing array 300 are similar to those of above embodiment, without repeating herein.

On a basis of the same inventive concept, a display device is further provided in an embodiment of the present disclosure, comprising a display panel provided in embodiments of the present disclosure, the display device may be any product or component which has a display function, such as a mobile phone, a tablet computer, a television, a display, a laptop, a digital photo frame, a navigator. Embodiments of the display device may refer to above embodiments of the display panel, without repeating herein.

On a basis of the same inventive concept, a method for manufacturing above display panel may be provided by an embodiment of the present disclosure, comprising:

Forming patterns of the plurality of lower leads 301, the plurality of lower sensing electrodes 302, the piezoelectric layer, the plurality of upper sensing electrodes and the plurality of upper leads sequentially by a sol-gel process, before, after or during forming the plurality of pixel units which are arranged in an array on the substrate.

Specifically, patterns of the plurality of lower leads 301, the plurality of lower sensing electrodes 302, the piezoelectric layer, the plurality of upper sensing electrodes and the plurality of upper leads may be formed sequentially by ink-jet printing or screen printing.

The force sensing array is formed by a sol-gel process in above method for manufacturing as provided in embodiments of the present disclosure, facilitating an integration of a force sensing functionality into a display panel which may withstand relatively lower temperatures, e.g., an electroluminescent display device so as to realize a detection of a three-dimensional touch.

In above display panel, the method for manufacturing the same, and the display device provided by embodiments of the present disclosure, a force sensing array may be integrated into the display panel, which force sensing array is formed by lower leads, lower sensing electrodes, a piezoelectric layer, upper sensing electrodes and upper leads which are laminated sequentially. The plurality of lower sensing electrodes and the plurality of upper sensing electrodes are aligned with each other one by one, so as to be arranged in an array and each of the plurality of lower sensing electrodes and each of the plurality of upper sensing electrodes form a force sensing unit with the piezoelectric layer sandwiched therebetween. Each force sensing units which works on basis of a piezoelectric effect may function as a touch detection components for sensing a pressure applied to a surface of the display panel, and for outputting corresponding electrical signals by cooperation of the upper leads with the lower leads. By a detection to the change of the electrical signals, the corresponding pressing location and a level of the pressure on the surface of the display panel may be determined, and then a corresponding command is executed corresponding to the determined touch location and the level of a touch force. In case that the display panel is a flexible display panel, the force sensing units in the force sensing array which are integrated above or below the plurality of pixel units may also sense a tensile force applied on corresponding locations of the display panel once the display panel is bent, so as to control the display panel to execute a corresponding command according to the determined bent location and a level of the tensile force.

Above described are only some specific embodiments of the present disclosure, although the protect scope of the present disclosure is not limited thereto. Those skilled in the art will readily conceive modifications or alternative within the technical scope in this disclosure. Accordingly, the protection scope of the present disclosure should be defined by the claims and their equivalents.

What is claimed is:

1. A display panel, comprising:
   a substrate;
   a plurality of pixel units provided on the substrate and arranged in an array; and
   a force sensing array provided above, below or within the plurality of pixel units in a direction of a thickness of the display panel,
   wherein the force sensing array comprises a plurality of lower leads, a plurality of lower sensing electrodes, a piezoelectric layer, a plurality of upper sensing electrodes and a plurality of upper leads, which are laminated sequentially;
   wherein the plurality of lower sensing electrodes and the plurality of upper sensing electrodes are aligned with each other one by one respectively, and arranged in an array respectively, and each of the plurality of lower sensing electrodes and each of the plurality of upper sensing electrodes form a force sensing unit with the piezoelectric layer sandwiched therebetween; and
   wherein each of the plurality of lower leads and each column of the force sensing units are aligned with each other one by one, and each of the plurality of upper leads and each row of the force sensing units are also aligned with each other one by one; or, each of the plurality of lower leads and each row of the force sensing unit are aligned with each other one by one and each of the plurality of upper leads and each column of the force sensing units are also aligned with each other one by one.

2. The display panel according to claim 1, wherein the plurality of lower sensing electrodes and the plurality of upper sensing electrodes respectively form a pattern of grid in which opening areas of the plurality of pixel units are aligned with meshes thereof, in case that force sensing array is provided on a display side of the plurality of pixel units; or the plurality of lower sensing electrodes and the plurality of upper sensing electrodes respectively form a pattern of blocks, in case that the plurality of lower sensing electrodes and the plurality of upper sensing electrodes are made of a transparent conductive material.

3. The display panel according to claim 2, wherein the piezoelectric layer forms a pattern of grid in which opening areas of the plurality of pixel units are aligned with meshes thereof, and a grid line width of a grid structure of the piezoelectric layer is larger than that of a grid structure of the lower sensing electrodes.

4. The display panel according to claim 2, wherein the piezoelectric layer is made of transparent piezoelectric ceramic and is of an integral layer construction.

5. The display panel according to claim 1, wherein both the plurality of lower sensing electrodes and the plurality of upper sensing electrodes form a pattern of blocks and the piezoelectric layer is of an integral layer construction, in case that the force sensing array is provided on a side of the plurality of pixel units opposite to the display side thereof.

6. The display panel according to claim 1, wherein an elastic spacer layer and a flexible film covering the elastic spacer layer are provided between the force sensing array and the plurality of pixel units, in case that the force sensing array is provided below the plurality of pixel units.

7. The display panel according to claim 1, wherein the lower sensing electrodes and the upper sensing electrodes are made of an organic conductive material.

8. The display panel according to claim 7, wherein the lower sensing electrodes and the upper sensing electrodes are made of PEDOT.

9. The display panel according to claim 1, wherein the lower leads and the upper leads are made of an inorganic conductive material.

10. The display panel according to claim 9, wherein the lower leads and the upper leads are made of silver or ITO.

11. The display panel according to claim 1, wherein the piezoelectric layer is made of lead zirconate titanate piezoelectric ceramics.

12. The display panel according to claim 1, wherein the display panel is a flexible display panel.

13. The display panel according to claim 12, wherein the force sensing array is at least provided in a frame area of the flexible display panel.

14. The display panel according to claim 1, wherein the display panel is one of a liquid crystal display panel, an electroluminescent display panel, a plasma display panel and an electronic paper.

15. The display panel according to claim 14, wherein the force sensing array is provided above the plurality of pixel units and specifically provided on an encapsulation film of the plurality of pixel units, in case that the display panel is the electroluminescent display panel.

16. The display panel according to claim 14, wherein the force sensing array is provided within the plurality of pixel units and specifically provided on a film between light emitting components and pixel circuits of the plurality of pixel units, in case that the display panel is the electroluminescent display panel.

17. A display device comprising the display panel according to claim 1.

18. A method for manufacturing the display panel according to claim 1, comprising steps:

forming patterns of the plurality of lower leads, the plurality of lower sensing electrodes, the piezoelectric layer, the plurality of upper sensing electrodes and the plurality of upper leads sequentially by a solution process, before, after or during forming the plurality of pixel units arranged in an array on the substrate, such that the force sensing array is provided above, below or within the plurality of pixel units in a direction of a thickness of the display panel.

19. The method according to claim 18, wherein the step of forming patterns of the plurality of lower leads, the plurality of lower sensing electrodes, the piezoelectric layer, the plurality of upper sensing electrodes and the plurality of upper leads sequentially by a solution process specifically comprises:

forming patterns of the plurality of lower leads, the plurality of lower sensing electrodes, the piezoelectric layer, the plurality of upper sensing electrodes and the plurality of upper leads sequentially by ink-jet printing or screen printing.

\* \* \* \* \*